United States Patent
Neufeglise

(10) Patent No.: US 9,487,131 B2
(45) Date of Patent: Nov. 8, 2016

(54) SYSTEM AND METHOD FOR MOUNTING AN INTERIOR LIGHT BAR WITHIN A VEHICLE

(71) Applicant: STAR HEADLIGHT & LANTERN CO., INC., Avon, NY (US)

(72) Inventor: Steven W. Neufeglise, Rochester, NY (US)

(73) Assignee: STAR HEADLIGHT & LANTERN CO., INC., Avon, NY (US)

( * ) Notice: Subject to any disclaimer, the term of this patent is extended or adjusted under 35 U.S.C. 154(b) by 0 days.

(21) Appl. No.: 14/179,518

(22) Filed: Feb. 12, 2014

(65) Prior Publication Data

US 2015/0224923 A1    Aug. 13, 2015

(51) Int. Cl.
*B60Q 1/52* (2006.01)
*B60Q 1/26* (2006.01)
*B60Q 3/02* (2006.01)

(52) U.S. Cl.
CPC ............... *B60Q 1/52* (2013.01); *B60Q 1/268* (2013.01)

(58) Field of Classification Search
CPC .............. F21L 4/04; F21S 4/00; F21S 4/003; F21S 4/008; F21S 8/10; F21S 48/211; F21S 48/212; F21S 48/218; F21V 17/18; F21V 21/092; F21V 21/096; F21V 21/10; F21V 21/14; F21V 21/26; F21V 21/30; B60Q 1/52; B60Q 1/268
See application file for complete search history.

(56) References Cited

U.S. PATENT DOCUMENTS

| | | | |
|---|---|---|---|
| 1,541,376 A | 6/1925 | Nock | |
| 1,672,779 A | 6/1928 | Raidt | |
| 1,674,340 A | 6/1928 | Nock | |
| 2,017,798 A | 10/1935 | Gillespie | |
| 3,576,437 A | 4/1971 | Peron | |
| 3,665,392 A | 5/1972 | Annas | |
| D246,330 S | 11/1977 | Krase et al. | |
| 4,449,167 A | 5/1984 | Cohen | |
| 4,651,129 A | 3/1987 | Woods et al. | |
| 4,654,757 A * | 3/1987 | Birkhauser | B60Q 1/302 362/287 |
| 4,733,335 A | 3/1988 | Serizawa et al. | |
| 4,981,363 A | 1/1991 | Lipman | |

(Continued)

FOREIGN PATENT DOCUMENTS

JP    04143133 A    5/1992

OTHER PUBLICATIONS

Installation and Instruction Manual, Star Mini Phantom, Star Headlight & Lantern Co., Inc., 2012.

*Primary Examiner* — Anh Mai
*Assistant Examiner* — Nathaniel Lee
(74) *Attorney, Agent, or Firm* — Kenneth J. Lukacher Law Group

(57) ABSTRACT

A mounting system for an interior light bar is provided having a pair of brackets pivotally mounted at opposite ends of a housing of a light bar so that the brackets and housing rotate with respect to each other. The brackets each have a front platform with adhesive material for attaching the brackets against a glass surface within a vehicle. With the brackets stationary against a glass surface, the light bar housing is pivoted to horizontally level the light bar despite any curvature or slope of the glass surface. Each of brackets has a pawl member having protrusions which when rotated engage different sets detents along a curved ratchet surface along the back of the housing to releasably lock the housing and brackets with respect to each other along one of multiple pivot positions.

14 Claims, 4 Drawing Sheets

(56) References Cited

U.S. PATENT DOCUMENTS

| | | |
|---|---|---|
| 5,050,051 A | 9/1991 | Machida et al. |
| D349,517 S | 8/1994 | Neff |
| D451,218 S | 11/2001 | Bernier |
| D461,574 S | 8/2002 | Helmke, III |
| D472,986 S | 4/2003 | Kim |
| D483,505 S | 12/2003 | Schwerdtmann |
| D483,888 S | 12/2003 | Pokorny et al. |
| D489,144 S | 4/2004 | Dalton, Jr. |
| 6,842,110 B2 | 1/2005 | Quigley et al. |
| D509,919 S | 9/2005 | Durgan et al. |
| 6,966,682 B2 | 11/2005 | Frank et al. |
| D520,156 S | 5/2006 | Campagna |
| 7,036,965 B2 | 5/2006 | Dalton, Jr. et al. |
| D523,165 S | 6/2006 | Schultz |
| 7,106,185 B1 | 9/2006 | Neufeglise |
| D530,029 S | 10/2006 | Neufeglise et al. |
| D530,437 S | 10/2006 | Neufeglise et al. |
| D558,379 S | 12/2007 | Citterio |
| D579,139 S | 10/2008 | Ghini |
| D581,074 S | 11/2008 | Starr |
| 7,513,659 B2 | 4/2009 | Vukosic et al. |
| D615,223 S | 5/2010 | Huang |
| D619,292 S | 7/2010 | Pei et al. |
| D627,905 S | 11/2010 | Swafford et al. |
| D652,335 S | 1/2012 | Deyaf |
| 8,192,063 B2 | 6/2012 | Neufeglise |
| D680,894 S | 4/2013 | Yu |
| D682,722 S | 5/2013 | Yu |
| D710,726 S | 8/2014 | Neufeglise |
| 2005/0018441 A1* | 1/2005 | Menke ................ B60Q 1/2611 362/493 |
| 2005/0117333 A1* | 6/2005 | Yoshida ................ F21S 8/033 362/147 |

* cited by examiner

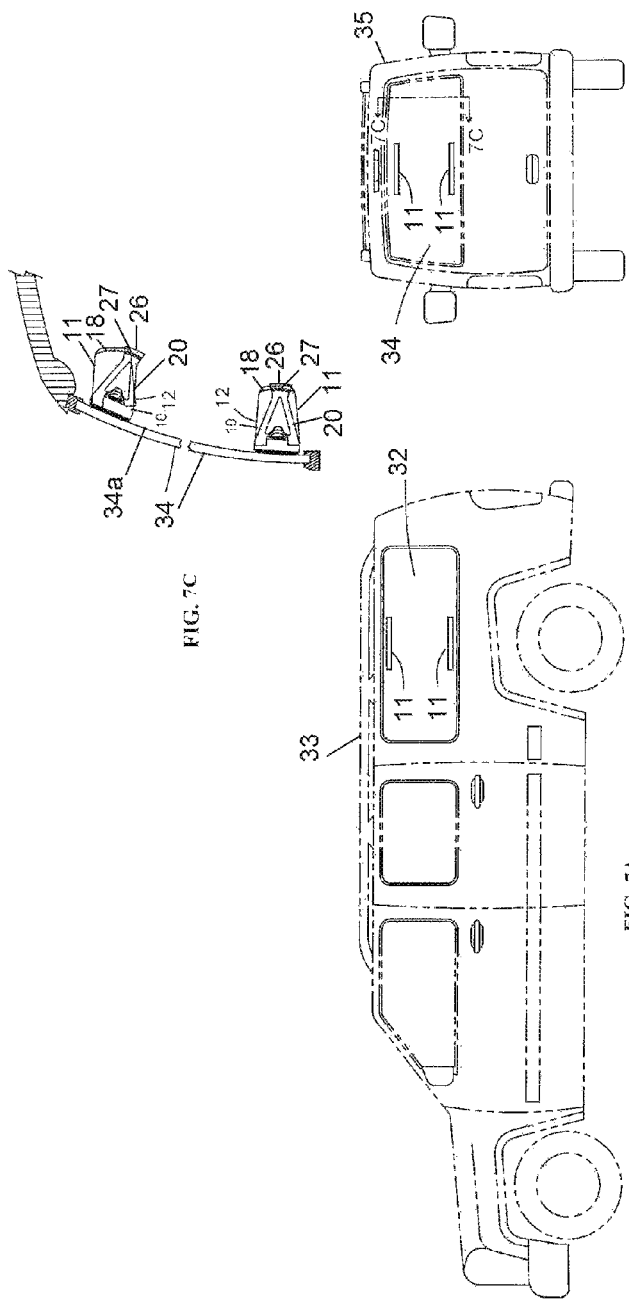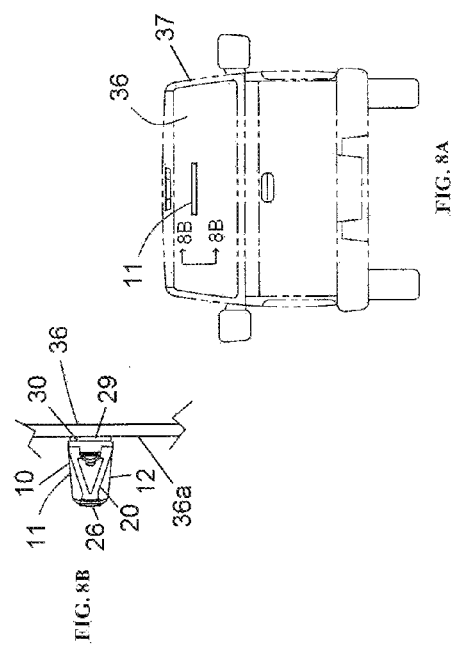

SYSTEM AND METHOD FOR MOUNTING AN INTERIOR LIGHT BAR WITHIN A VEHICLE

FIELD OF THE INVENTION

The present invention relates to a system and method for mounting an interior light bar within a vehicle, and more particularly to a system and method for mounting a light bar directly onto the glass surface of windshield or window within a vehicle to provide warning light signals. The invention is particularly useful for universal mounting interior light bars onto glass surfaces of vehicles of different makes and models where such glass surfaces have curvatures varying from sloped to vertical along front windshields, or along passenger side or rear windows.

BACKGROUND OF THE INVENTION

Interior light bars used in undercover or unmarked police vehicles, are thus often called undercover light bars and provide emergency warning lights when actuated. Such light bars are thin in profile, e.g., at or less than 1 inch high, and are mounted in a vehicle to direct light outward. It is important that emergency warning lights of such light bars be adjusted properly for maximum efficiency so that their warning flash reaches out as far as possible. Although installation may be to the dash, mirror, or deck of the vehicle, often undercover light bars are installed directly onto the interior glass surface of the vehicle.

In the emergency vehicle lighting industry one of the problems is to make warning lights as universally mountable as possible in order to fit a wide variety of vehicles of different makes and models. Given the differences of angles, slopes and curvatures of various vehicle windows, and where the light is placed on the window, be it front, side or rear, mounting brackets are a key factor in a lights' effectiveness. Current approaches to solving this problem insert or attach the miniature light bar using mounting fixtures or brackets, each designed for application to a particular interior glass surface of specific vehicle(s). For example, the fixture may be a hood having a forward most edge sloped to correspond (at least approximately) to the slope of the interior glass surface so that the light bar's housing is horizontally level without an undesirable upward or downward vertical tilt. Such vehicle specific interior light bar mounting fixtures or brackets often accommodate only the most common vehicles and consequently do not always optimally fit in less common vehicles. Another problem is that a interior light bar mounted onto a glass surface of a vehicle cannot often be transferred to a different vehicle, or to another glass surface in the same vehicle, which has a different curvature without the need for different mounting fixtures or brackets to properly level the light bar.

SUMMARY OF THE INVENTION

Accordingly, it is an object of the present invention to provide a system and method for mounting a light bar onto interior vehicle glass surfaces of different slopes or vertical in which the light bar is properly oriented to direct light outwards for the vehicle as desired, thereby avoiding the need for vehicle specific mounting fixtures or brackets.

It is another object of the present invention to provide a system and method for mounting a light bar with improved brackets that are pivotable mounted onto ends of a light bar housing where brackets attach to a glass surface, and the light bar housing may be then pivoted to adjust the tilt or pivot position of the light bar with respect to such brackets so as to level the light bar regardless of the curvature of the glass surface being sloped or vertical.

A further object of the present invention is to provide brackets pivotable mounted onto ends of a light bar housing where brackets and housing releasably lock at one of a plurality of pivot positions using pawl and ratchet mechanisms until the light bar and its housing is properly positioned.

Briefly described, a mounting system for an interior light bar is provided having a pair of brackets pivotally mounted at opposite ends of a housing of a light bar, and a mechanism for releasably locking the pivot position of the brackets and the housing with respect to each other. Each bracket has a front portion or platform with a fastener for mounting the bracket against a glass surface within a vehicle. For example, the fastener may be double-sided adhesive tape, adhesive layer of material, releasable fasteners (e.g., Velcro®), or reclosable fasteners (e.g., 3M dual lock®).

Preferably the ends of the housing each have a curved opening receiving a pivot member extending from a different one of the bracket so that housing and brackets rotate or pivot with respect to each other along a common rotational axis extending through the pivot members of the brackets. The edge or lip of each of the opening rides along a rotational guide track provided along pivot member between a wall of the bracket and a retaining tab at the end of the pivot member.

The mechanism for releasably locking the pivot position is provided by each bracket having a pawl member having protrusions that are pressed into engagement of a ratchet surface having detents or teeth along the back of the housing. The ratchet surface is curved along the rotational axis of the bracket so that the pawl member follows the curvature of the racket surface. The pawl member is slidable along the ratchet surface of the housing as the bracket and housing pivot or rotate with respect to each other to select one of multiple pivot positions between the bracket and the housing, in which the pawl member's protrusions provide click and lock stops along ratchet surface's detents.

For mounting, the assembly of the light bar housing and brackets pivotally mounted at the ends thereof are placed against a desired glass surface so that the brackets attach to the glass surface, such by adhesive or other fastening material(s), along the front platforms of the brackets. With the brackets now stationary against the glass surface, the light bar housing is pivoted or rotated in the brackets to a desired position, such as horizontally (or approximately horizontally) level. This enables the housing for the light bar to be placed up against vertical window as well as any sloped window as desired within pivot angular range of the pawl members along their respective ratchet surfaces.

BRIEF DESCRIPTION OF THE DRAWINGS

The foregoing and other object features and advantages of the invention will become more apparent from a reading of the following description in connection with the accompanying drawings in which:

FIG. 7A is a view of a vehicle showing an example of two light bars mounted by the brackets of FIG. 1 to a side window within the vehicle;

FIG. 7B is a view of a vehicle from the rear thereof showing an example of two light bars of FIG. 1 mounted by the mounting brackets of FIG. 1 to a rear window within the vehicle in which the window has curvature or slope;

FIG. 7C is a broken cross-sectional view of the rear window of FIG. 7B along lines 7C-7C showing two light bars of FIG. 7B with their housings pivoted with respect to their mounting brackets to two different positions in accordance with the increasing curvature or slope from bottom to top of the rear window in order to horizontally level their respective light bars;

FIG. 8A is a view of a vehicle showing an example of the light bar mounted by the mounting brackets of FIG. 1 to a rear window within a vehicle in which the window is vertical, e.g., zero or near zero slope; and FIG. 8B is a cross-sectional view of the rear window of FIG. 8A along lines 8B-8B showing the light bar with its housing pivoted to a central position with respect to its mounting brackets to horizontally level the light bar.

DETAILED DESCRIPTION OF THE INVENTION

Figure 1:
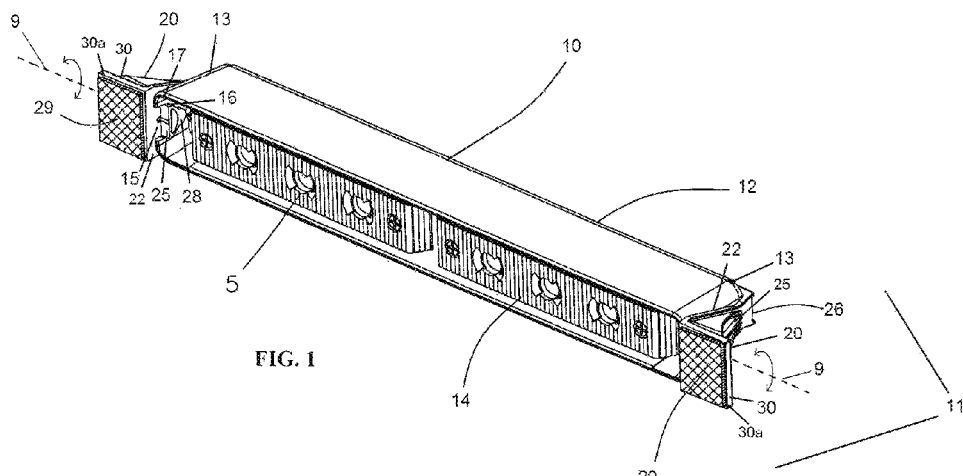
FIG. 1 is a perspective view looking downwardly at the front of a light bar housing and mounting brackets of the present invention for attachment on the interior glass surface of a vehicle.
Figure 2:
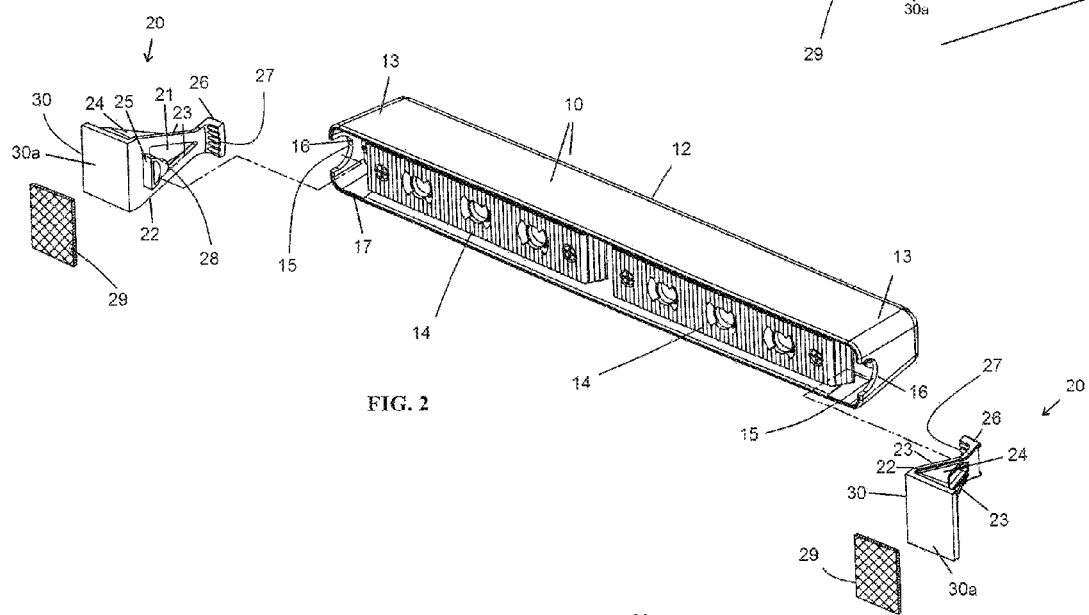
FIG. 2 is a perspective exploded view of the assembly of the light bar housing and mounting brackets of FIG. 1.
Figure 3:
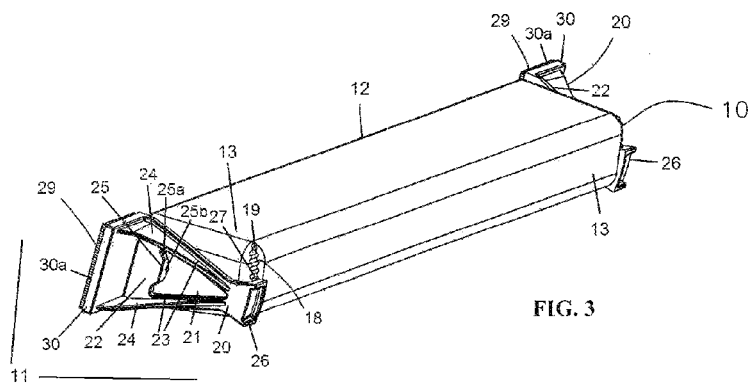
FIG. 3 is another perspective view looking downwardly of the rear at the light bar housing and mounting brackets of FIG. 1.
Figure 5A:
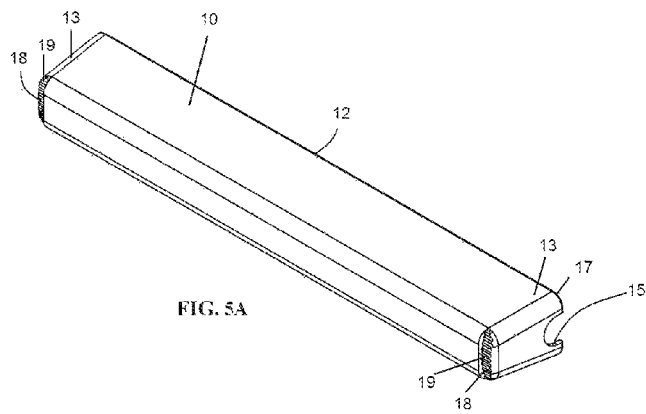
FIGS. 5A and 5B are rear perspective and side end views, respectively, of the light bar housing of FIG. 1 as a separate piece part.
Figure 5B:
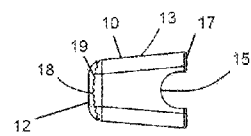

Referring more particularly to the drawings, FIGS. 1, 2, and 3 show a light bar 10 having a housing 12 containing an optical system 14 providing optical warning signals typical of a light bar. The housing 12 has two opposing ends 13 and is part of the assembly 11 of the mounting system of the present invention with mounting brackets 20. Each end 13 has a curved opening 15 along the housing's front opening or edge 17, and a curved ratchet surface 18 with parallel dents or teeth (or ratchets) 19 along the back of housing 12. The ratchet surface 18 is best shown in FIGS. 5A and 5B.

A pair of brackets 20 is provided having one bracket 20 for each of ends 13. The bracket 20 is best shown in FIGS. 4, 6A, 6B, and 6C. Each bracket 20 has a wall 22 composed of two legs 23 which form a Y shape. The wall 22 has an inwardly extending pawl member 26 where legs 23 rearwardly meet. Pawl member 26 has forward facing series of parallel protrusions or detents 27 that can mate between with detents or teeth 19 of ratchet surface 18 along the back side of housing 12. Along the front portion of bracket 20, wall 22 connects to a platform 30 which extends outwardly in opposite direction from pawl member 26. Two support ribs 24 are provided which extend outwardly from legs 23 to opposite sides of platform 30 along the back thereof (see FIG. 3). A triangular opening 21 is formed between legs 23, and the legs join together to define the wall 22 between the base of triangular opening 21 for connection to platform 30. Optionally, wall 22 may be provided without triangular opening 21 and separate legs 23.

Figure 6A:
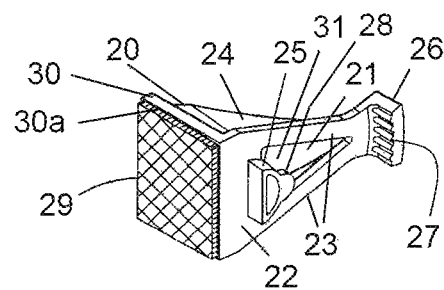
FIGS. 6A and 6B are perspective and side views, respectively, of one of the mounting brackets of FIG. 1.
Figure 6B:
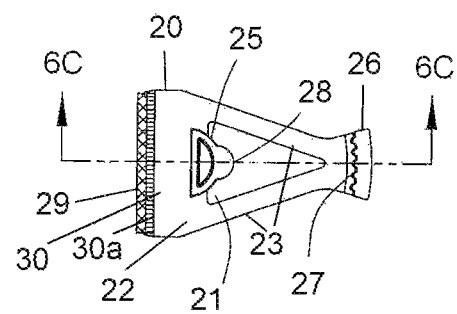
Figure 6C:
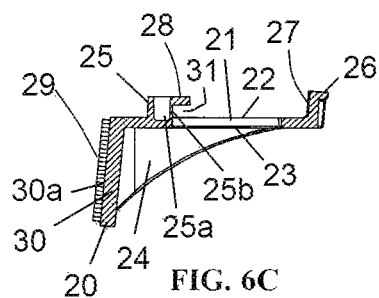
FIG. 6C is a cross-sectional view of the mounting bracket along lines 6C-6C in FIG. 6B.

Between pawl member 26 and platform 30, centered near the base of triangular opening 21, a pivot member or shaft 25 inwardly extends from wall 22 and has a retainer member or tab 28 at the end thereof (see FIGS. 6A-6C). The edge or lip 16 of opening 15 rides along a rotational guide track 31 provided by the surface of pivot member 25 between wall 22 and retaining tab 28 (see FIG. 4). The width of guide track 31 is slightly less than the housing's wall thickness at end 13. For example, pivot member 25 may be half of a cylinder-like structure with diameter of about ½ inch. Openings 15 along housing 12 are sized to receive pivot members 25 of brackets 20 to enable rotational movement of brackets 20 with respect to ends 13. The rotation or pivot movement of brackets 20 is along a rotational axis 9 through their pivot members 25 as illustrated by arrows in FIG. 1, and likewise rotation of housing 12 with respect to brackets 20 is along rotational axis 9, as also shown by such arrows.

Figure 4:
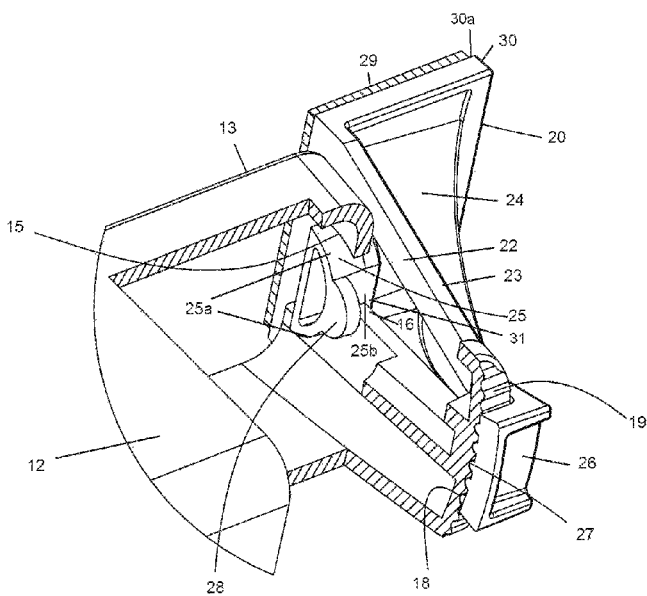
FIG. 4 is a partial broken perspective view of one of the mounting brackets of FIG. 1 along end of the light bar housing.

As best shown in FIG. 4, ratchet surface 18 is curved about the rotational axis 9 to provide a pivoting angular range (e.g., 0 to 60°) of brackets and housing 12 with respect to each other. Pawl member 26 is mechanically coupled by wall 22 with pivot member 25 of the bracket 20 so that pawl member 26 rotates with rotation of pivot member 25. Such rotation of pawl member 26 is along the same rotational axis 9 as ratchet surface 18 to assure proper engagement of pawl member's protrusions 27 at different positions along the ratchet surface. Also, pawl member 26 may be slightly curved along an arc about the rotational axis 9 so that it follows the curvature or arc of the ratchet surface 18. Although each bracket 20 is independently rotatable with respect to their associated end 13 of housing 12, brackets 20 rotate with respect to housing 12 in concert with each other when brackets 20 are attached to a common glass surface.

As shown in FIGS. 4 and 6C, pivot member 25 need not be entirely curved along pivot track 31. For example, pivot track 31 along pivot member 25 may have two curved surfaces 25a and flat surface 25b there between. Other means for pivoting brackets 20 with respect to ends 13 may be used, such as pivot member 25 instead extending from each end 13 and rotatable in an opening of bracket 20.

Each bracket 20 is sized so that when its pivot member 25 is received along opening 15 of one of ends 13 of housing 12, the bracket's protrusions 27 engage detent 19 of ratchet surface 18 to releasably lock the rotational position of the bracket 20 with respect to such end 13. Different rotational positions are selectable by pivoting bracket 20 with respect to such end 13 along their pivot member 25 which pivots pawl members 26 with respect to ratchet surface 18 causing a "clicking" sound as the pawl protrusions 27 snap into different sets of detents 19 along ratchet surface 18.

As shown in FIGS. 1, 2, and 6A-6C, a fastener or double-sided adhesive tape 29 is attached on the top surface 30a of platform 30 of each of brackets 20 prior to attachment of brackets onto the surface of glass (or other transparent material). The bottom side of adhesive tape 29 having an adhesive layer of material strongly bonded onto platform 30, while the top side of adhesive tape 20 will provide a strong bond onto glass. Other means than adhesive tape 29 may be used for fastening surface 30a of bracket 20 to glass, such as an adhesive layer (e.g., epoxy), or releasable fastening devices, such as hook and loop materials (e.g., Velcro®), or reclosable fasteners (e.g., 3M dual lock®).

The mounting assembly 11 of housing 12 of light bar 10 and bracket 20 (FIGS. 1 and 3) may be installed along a desired interior glass surface of a vehicle. For example, one or more of mounting assemblies 11 may be mounted along the interior surface of a side window 32, rear window 34, or rear window 36, for vehicles 33, 35, or 37, respectively, as shown for example in FIGS. 7A, 7B, and 8A, respectively.

For installation of light bar 10, mounting assembly 11 is placed against the desired vehicular glass surface with the top side of adhesive tape 29 of brackets 20 exposed so that the brackets 20 attach to the glass surface at a desired location. With brackets 20 now stationary against the glass, the housing 12 is the pivoted manually by the installer to adjust upwards or downwards (rotating along rotational axis 9) with respect to such stationary brackets 20 until a desired rotational or tilt position is achieved, so that the light from the light bar when actuated exits (or is aimed) at the desired orientation through the glass surface.

Consider a sport utility vehicle (or SUV) side or rear window may be almost vertical at the bottom, but as this same window approaches the roof it tends to lean inward and curve due to the vehicles' styling profile. An interior light bar without the mounting system of the present invention placed at the bottom of such window with no adjusting feature may be in almost perfect horizontal alignment however, this same light bar placed at the top of the window could be "aiming" skyward 5 to 10 degrees, greatly diminishing the lights' effectiveness and warning capabilities. The mounting assembly 11 solves this as shown, for example, in FIGS. 7B and 7C.

FIG. 7C shows a cross-sectional view of the two mounting assemblies 11 of FIG. 7B on rear window 34, such as that typical of an SUV that increases in slope or curvature as the window extends upward. For each assembly 11 after its two brackets 20 are attached to glass surface 34a of window 34 by fasteners 29, the housing 12 of the assembly is pivoted or rotated until housing 12 is horizontally level. As shown in FIG. 7C, the pawl member 26 of each assembly 11 of FIG. 7C engages a different portion of ratchet surface 18 in accordance with the slope of surface 34a. In this manner, regardless of the curvature or slope of the glass surface, a pivot position is selected for housing 12 of assembly 11 with respect to its brackets 20 that is horizontally level or at least approximately level. Although horizontally level is preferred in most cases for on-glass light bar installations, the light bar housing 12 may be at other tilt positions which are non-horizontal as desired. The cross-section of FIG. 7C may also be representative of curvature or slope of side window 32 of FIG. 7A. The mounting assembly 11 may be similarly positioned on an interior surface of a windshield of a vehicle. In FIG. 8B, the mounting assembly 11 is attached by its brackets 20 onto glass surface 36a of rear window 36 of FIG. 8A, and then adjusted (if needed) for mounting to a vertical or near zero slope of surface 36a. Thus, adjusting the light bar 10 horizontal, or otherwise, whether mounted at the top or bottom of the window, needs only ratcheting of the light bar housing 12 with respect to pawl members 26 by their protrusions 27 falling into the appropriate "stops" between dents 19 of ratcheting surfaces 18 causing the light bar 10 to be properly aimed.

The housing 12 is miniature in size to provide a thin profile. For example, housing 12 may be 1 inch or less in height, 1.5 inches in depth, and 9 inches in length. The optical system 14 may be, for example, reflectors, lenses, and light sources (e.g., LEDs), of the ULB9S Mini-Phantom® manufactured by Star Headlight and Lantern Company of Avon, N.Y. However, the invention is not limited to any particular optical system, as other optical systems may contained in housing 12 to provide light through front housing opening or edge 17 (FIG. 1) which is desired to be mounted to a glass surface within a vehicle, such as a truck, car, SUV, or boat.

The housing 12 and brackets 20 of assembly 11 may be made of molded plastic. Optionally, housing 12 may be formed from one or more molded components and joined together. Although not shown, openings are provided as needed along housing 12 for electronically connection for power and control of the light bar, as typical of light bars to enable operation (e.g., flashing and/or patterns) of illumination sources of optical system 14.

Although preferably brackets 20 has the configuration shown in the figures, bracket wall 22 may be other shapes or configurations than shown so long as that pawl member 26 and fastener support surface 30a are present along the rear and front portions, respectively, of each bracket, and that means (e.g., pivot member 25) are provided for pivotally mounting brackets for rotation with respect to housing ends 13 for rotating pawl member 26 along ratchet surface 18 at ends 13 to lock or stop at one of multiple pivot or rotational positions. Further, the size and number detents 19 may be different than shown in the figures so long as they extend on ratchet surface 18 along a desired pivoting angular range about axis 9. The angular range is in accordance with the range of slopes of glass surfaces onto which assembly 11 will be mounted. Also, size and number (1 or more) of protrusions 27 extending from pawl member 26 may be different than shown in the figures so long as they face and selectably engage between different sets of detents 19 over the angular range such detents extend along ratchet surface 18.

From the foregoing description it will be apparent and has been provided an improved system and method for mounting undercover interior light bars within a vehicle. Variations and modifications in the herein described system, method, and brackets, will undoubtedly suggest themselves to those skilled in the art. Accordingly the foregoing description should be taken as illustrative and not in a limiting sense.

The invention claimed is:

1. A system for mounting a light bar within a vehicle comprising:
    a pair of brackets pivotally mounted at opposite ends of a housing of a light bar providing warning light signals;
    each of said brackets having a front portion with means for fastening the bracket against an interior glass surface of a vehicle so that said warning light signals from said light bar are directed outward from said vehicle; and
    means at each of said opposite ends of said housing for releasably locking the brackets with respect to the housing at one of a plurality of different pivot positions, wherein said means for releasibly locking comprises a pawl member along each of said brackets which releasibly engages a ratchet surface along said housing at each of said plurality of different pivot positions, and said pawl member of each of said brackets is along a rear portion of the bracket, and said ratchet surface is provided upon an exterior back surface of said housing at each of said opposite ends of said housing.

2. The system according to claim 1 wherein each of said ends of said housing has a curved opening, and each of said brackets has a pivot member rotationally mounted along said curved opening to rotate said pawl member along said ratchet surface.

3. The system according to claim 1 wherein said fastening means is one of a double sided adhesive tape or a layer of adhesive material.

4. The system according to claim 1 wherein said fastening means releasably attaches the bracket to the glass surface.

5. The system according to claim 1 wherein said glass surface is along the interior of one of a windshield or window of said vehicle.

6. The system according to claim 5 wherein said warning light signals extend from said light bar outward from said vehicle via said windshield or window.

7. The system according to claim 1 further comprising mean in said housing of said light bar for generating said warning light signals having one or more of flashing and patterns of illumination.

8. A system for mounting a light bar within a vehicle comprising:
a pair of brackets pivotally mounted at opposite ends of a housing of a light bar providing warning light signals;
each of said brackets having a front portion with means for fastening the bracket against an interior glass surface of a vehicle so that said warning light signals from said light bar are directed outward from said vehicle; and
means at each of said opposite ends of said housing for releasably locking the brackets with respect to the housing at one of a plurality of different pivot positions, wherein each of said ends of said housing has a curved opening, and each of said brackets has a pivot member rotationally mounted along said curved opening to rotate said pawl member along said ratchet surface, and said pivot member extends through said curved opening and has a retainer member which captures the edge of the housing about said opening.

9. The system according to claim 8 wherein said pivot member rotates along a rotational axis, and said ratchet surface is curved about said rotational axis.

10. A mounting system for an interior light bar comprising:
a pair of brackets pivotally mounted at opposite ends of a housing of a light bar providing warning light signals so that the brackets and the housing each independently rotate with respect to each other along a common rotational axis;
each of said brackets have a fastener along the front thereof for attaching the brackets against a glass surface within a vehicle; and
each of said brackets has a pawl member having one or more protrusions which is rotatable to engage detents along a ratchet surface of the housing to releasably lock the housing and the brackets with respect to each other along one of multiple pivot positions to at least approximately horizontally level the light bar despite any curvature or slope of the glass surface when the brackets are attached to the glass surface, wherein said ratchet surface is along an exterior back surface of the housing and faces away from said glass surface, and said one or more protrusions of said pawl member face toward said glass surface to engage said ratchet surface at each of said multiple pivot positions.

11. The mounting system according to claim 10 wherein said ratchet surface is curved about said rotational axis.

12. The mounting system according to claim 10 further comprising an optical system in said housing of said light bar for generating said warning light signals having one or more of flashing and patterns of illumination, in which said optical system has at least light sources.

13. The mounting system according to claim 10 wherein said housing comprises a front opening between said ends of said housing, and said warning light signals are outputted from said housing via said front opening which faces said glass surface so that said warning light signals from said light bar are directed outward from said vehicle.

14. A bracket for mounting a light bar to glass surface comprising:
a front portion with a support surface for a fastener for attachment onto a glass surface;
a rear portion with a pawl member having one or more protrusions which engages teeth along a housing of a light bar providing warning light signals; and
a pivot member between said front portion and said rear portion for rotating the bracket about a rotational axis along an angular pivot range with respect to said housing to selectably engage said one or more protrusions to different sets of said teeth along said range, wherein said pivot member is disposed about an opening at one end of the housing to enable rotation of said bracket with respect to said housing, and said teeth are along an exterior curved back surface of the housing and face away from said glass surface and said one or more protrusions of said pawl member face toward said glass surface in selectable engagement with said different sets of said teeth as said pivot member rotates about said opening when said front portion is attached to said glass surface by said fastener.

* * * * *